Figure 1:
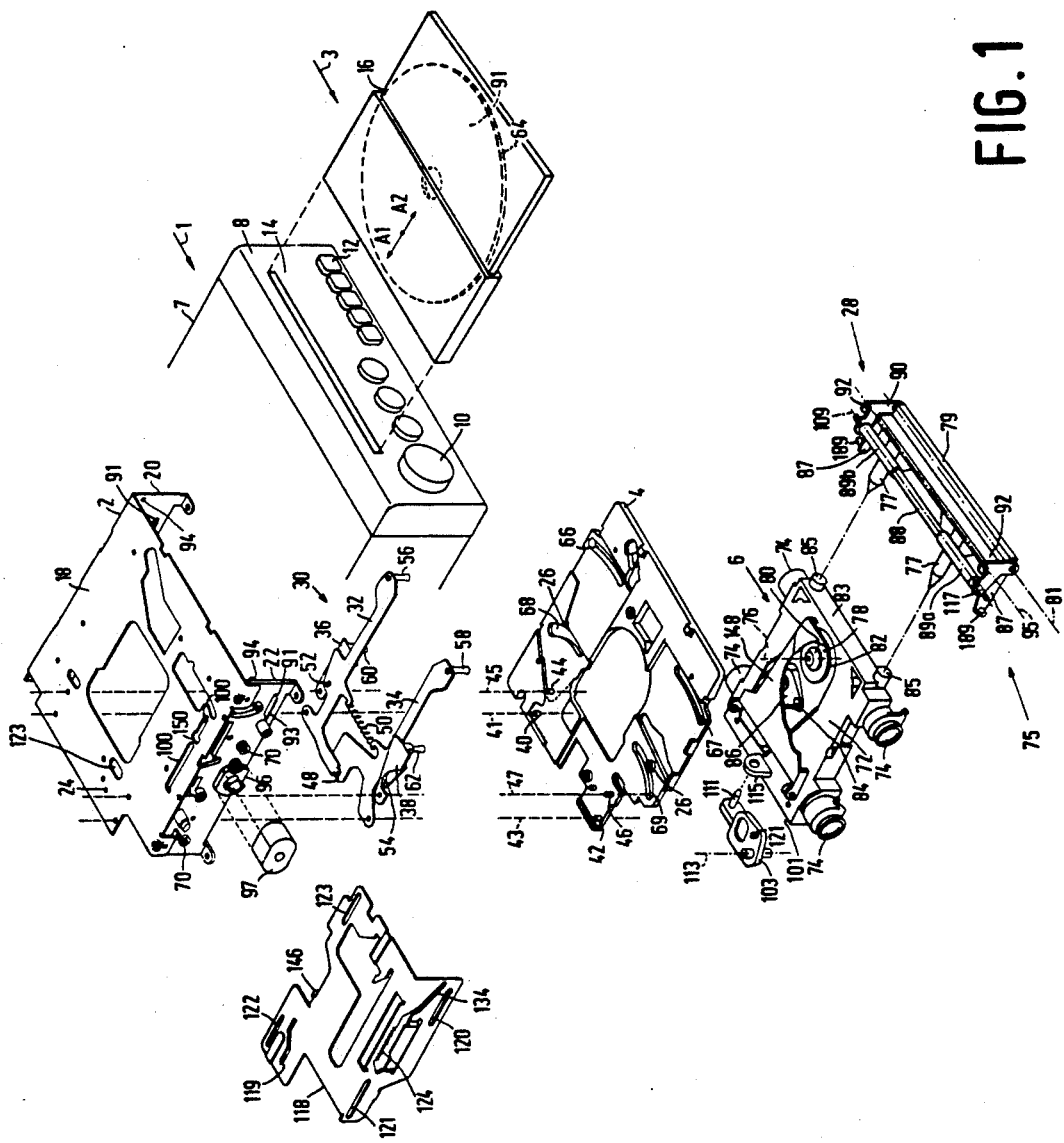

United States Patent [19]

Van Heusden et al.

[11] Patent Number: 5,212,683
[45] Date of Patent: May 18, 1993

[54] CASSETTE FOR STORING AND HANDLING AN INFORMATION CARRIER, AND SCANNING SYSTEM COMPRISING THE CASSETTE

[75] Inventors: Omar P. L. P. Van Heusden; Libert H. A. M. Camps; Guido H. J. Switten, all of Hasselt, Belgium

[73] Assignee: U.S. Philips Corporation, New York, N.Y.

[21] Appl. No.: 755,255

[22] Filed: Sep. 5, 1991

[30] Foreign Application Priority Data

Sep. 28, 1990 [NL] Netherlands .................. 9002125

[51] Int. Cl.$^5$ .............................................. B65D 85/30
[52] U.S. Cl. ................................... 369/291; 369/77.2; 360/99.06; 360/97.02; 206/444
[58] Field of Search .................. 369/275.5, 77.2, 291, 369/77.1; 360/132, 133, 99.06, 97.01, 99.02, 97.02

[56] References Cited

U.S. PATENT DOCUMENTS 5,096,064  3/1992  Rufo, Sr. et al. .................. 369/291

*Primary Examiner*—Paul M. Dzierzynski
*Assistant Examiner*—Don Wong
*Attorney, Agent, or Firm*—David R. Treacy

[57] ABSTRACT

The invention relates to a cassette (3) for the trouble-free storage of an information carrier and for conveniently inserting this information carrier into a scanning device. The cassette comprises a sleeve-shaped housing (301) and a box-shaped holder (303) which can be slid into the housing. The housing has an open first side (309) and, opposite thereto, an at least partly open second side (311). The holder, which extends permanently into the housing through the first side, is movable between a slid-out position, in which the holder together with the housing forms a storage space for the information carrier, and a slid-in position for moving the information carrier out of the cassette via said second side. Latching means (327, 327B) have been provided for latching the information carrier in the slid-out position of the holder.

14 Claims, 5 Drawing Sheets

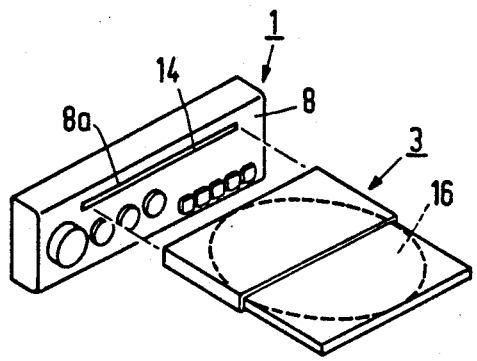
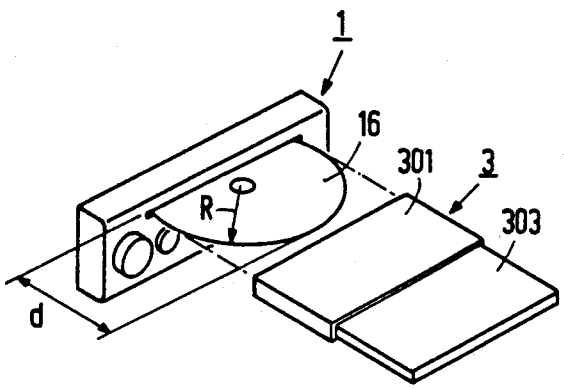
FIG.6A          FIG.6D
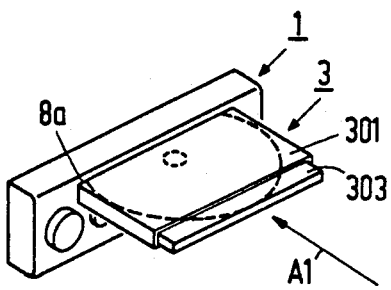
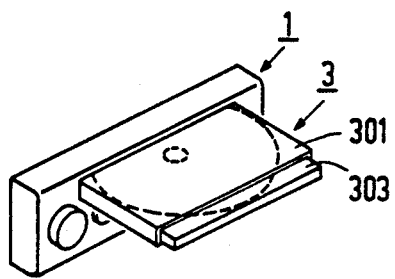
FIG.6B          FIG.6E
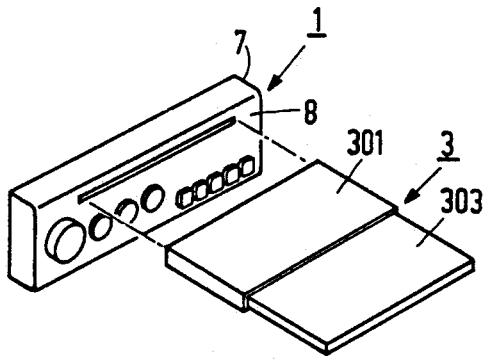
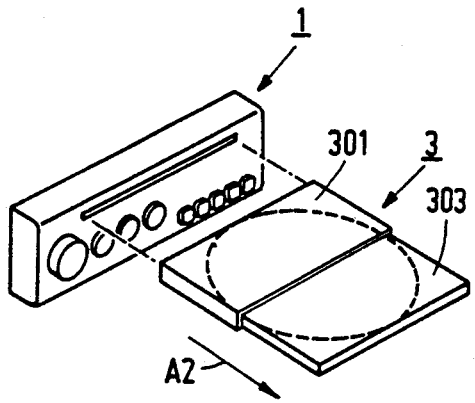
FIG.6C          FIG.6F

CASSETTE FOR STORING AND HANDLING AN INFORMATION CARRIER, AND SCANNING SYSTEM COMPRISING THE CASSETTE

The invention relates to a cassette for storing and handling an information carrier, the cassette comprising a housing and a box-shaped holder which is slidable in the housing.

The invention further relates to a scanning system for scanning an information carrier, the system comprising a scanning device and a cassette for storing and handling the information carrier.

A scanning system with such a cassette is known from French Patent Specification 2,584,225 (herewith incorporated by reference). The prior-art cassette comprises a case which is open at one side and a box-shaped holder which is open at one side. The holder, which depending on its dimensions can accommodate a gramophone record or an optical disc, is slidable into and out of the case. In the slid-in position of the holder, in which the holder is almost wholly inside the case, the holder functions as a cover. In the slid-out position of the holder, in which the holder and the case are wholly separated from one another, the holder can be utilised for loading a disc onto a turntable of a disc-record player, after which the holder can be removed by a sliding movement relative to the disc.

A drawback of the prior-art cassette, whose case and holder are detachable from one another, is that both hands have to be used to load the information carrier from the cassette onto the turntable of the disc-record player. Loading the information carrier from the turntable into the cassette has the same drawback.

A drawback of the prior-art scanning system is that it is rather inconvenient to place the information carrier onto the turntable and, in particular, to remove the information carrier from the turntable.

It is an object of the invention to provide a cassette having such features that it is possible to load an information carrier with only one hand from the cassette into a scanning device and/or from the scanning device into the cassette without the information carrier itself being touched.

To this end the cassette in accordance with the invention is characterized in that the sleeve-shaped housing has an open first side and, opposite thereto, an at least partly open second side, the holder, which extends permanently into the housing through said first side, being slidable between a slid-out position, in which the holder together with the housing forms a storage space for the information carrier, and a slid-in position for moving the information carrier out of the cassette via said second side, latching means being provided for latching the information carrier in the storage space in the slid-out position of the holder.

In the cassette in accordance with the invention the holder is coupled to the housing both in the slid-in position and in the slid-out position, an information carrier being inserted completely into the cassette or being moved out of the cassette in that the storage space is reduced by moving the holder relative to the housing. The cassette is particularly suitable for the storage of magnetic or optical cards and rotatable optical discs, such as CDs and mini-CDs, provided with audio, video or data information. In addition, the cassette is very suitable for use in situations where only one hand is available for handling the information carrier, as in a motor-vehicle equipped with a CD-player, where the driver should be capable of loading a CD into the player with one hand.

An embodiment of the cassette in accordance with the invention is characterized in that the latching means are arranged on the holder and comprise a spring mechanism for cooperation with a circumferential edge of the information carrier. These latching means enable an information carrier to be latched in the storage space without an information-carrying area of the information carrier being touched.

An embodiment of the cassette in accordance with the invention is characterized in that the spring mechanism comprises two latching elements, the distance between the latching elements which are engageable against the circumferential edge of the information carrier in the slid-out position of the holder being smaller than the diameter of the information carrier for which the cassette is intended. This construction enables the information carrier to be latched in the storage space in the slid-out position of the holder, and enables the latching elements to be used for gripping an information carrier which projects from a scanning device in the slid-out position of the holder.

A practical and simple embodiment of the cassette in accordance with the invention is characterized in that the spring mechanism comprises a wire or blade spring which is bent in the direction of insertion of the holder and which has two free end portions functioning as latching elements, a central portion of said spring being secured to the holder and the distance between the ends being variable by displacement of the end portions.

An embodiment of the cassette in accordance with the invention is characterized in that the latching means are situated substantially inside a reentrant wall portion of the holder. This guarantees a trouble-free movement of the holder and the housing relative to one another.

An embodiment of the cassette in accordance with the invention is characterized in that there are provided unlatching means for unlatching the information carrier which projects from the housing in the slid-in position of the holder, enabling the information carrier to be readily inserted into and removed from the holder in the slid-in position of the holder.

A practical embodiment of the cassette in accordance with the invention is characterized in that the unlatching means are arranged on the housing and comprise at least one unlatching element which presses against the latching means in the slid-in position of the holder to release the information disc. Preferably, the unlatching element is situated inside the housing, opposite the latching means.

In order to prevent the holder and the housing from being separated from one another in the slid-out position of the holder the housing and the holder comprise stops which cooperate with one another in the slid-out position of the holder.

To bring and keep the holder in the slid-out position relative to the housing at least one resilient element acts between the housing and the holder to exert on the holder a force which is directed from the slid-in towards the slid-out position. In a practical embodiment the resilient element is a longitudinally guided helical spring.

An embodiment of the cassette in accordance with the invention is characterized in that said second side has an insertion slot which narrows towards the slot ends. As a result of this, an information carrier situated in the insertion slot is supported only at its circumferential edge, which precludes damaging of the information-carrying area of the information carrier. Preferably, the open side of the holder has a similar insertion slot.

An embodiment of the cassette in accordance with the invention is characterized in that the holder comprises a wall having a projecting gripping surface and the housing comprises a wall having a recess which corresponds to the gripping surface and which is engaged by the projecting gripping surface in the slid-in position of the holder. Thus, the part to be held of the cassette is easy to recognize by a user.

The invention also aims at providing a scanning system which enables an information carrier to be loaded from a cassette into a scanning device and/or from the scanning device into the cassette with a simple operation.

To this end the scanning system in accordance with the invention is characterized in that the scanning device has an insertion slot for the information carrier and an external surface for cooperation with the cassette as claimed in any one of the preceding Claims. The advantages of the scanning system in accordance with the invention correspond to the afore-mentioned advantages of the cassette in accordance with the invention, a particularly attractive aspect being the ease of operation in combination with the excellent protection of the information carrier. Another advantage is that the provisions to be made on prior-art scanning devices of the appropriate type are only limited in order to adapt the relevant scanning device for cooperation with the cassette in accordance with the invention.

A practical embodiment of the scanning system in accordance with the invention is characterized in that the scanning device comprises an automatic loading device for the information carrier. Automatic loading systems are known per se and are capable of automatically transferring an information carrier inserted into the insertion slot to a rotatable turntable of the scanning device. In principle, an automatic loading device which is known per se need not be modified for cooperation with the cassette in accordance with the invention.

It is to be noted that DE-A 34 45 460 (herewith incorporated by reference) discloses a system comprising a CD player and a holder constructed as a clip. The holder comprises two clamping lugs between which a CD can be clamped. When a CD is loaded into the CD player the holder should be inserted into the player via a suitable opening, the player comprising means to move the clamping lugs apart in order to release the CD.

Figure 2:
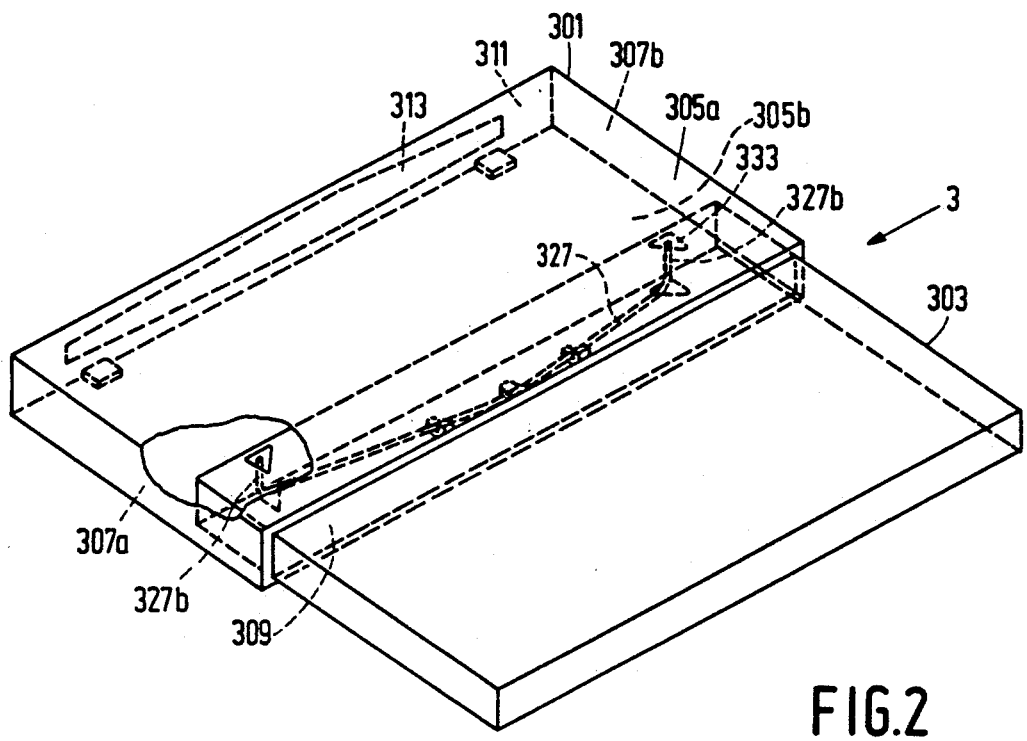
Figure 3:
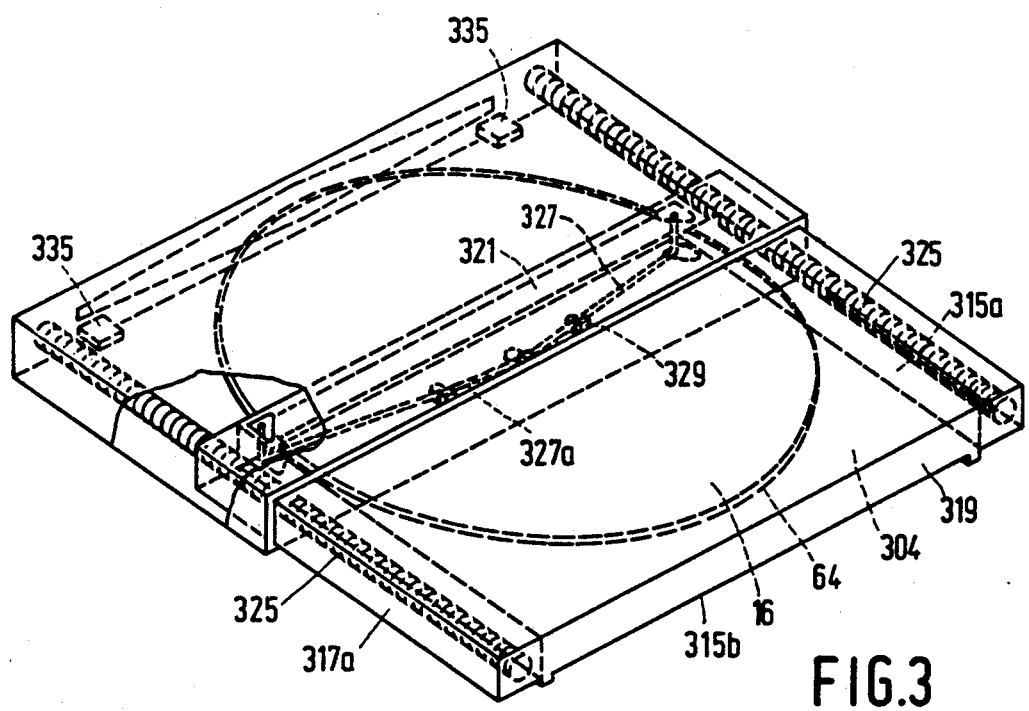
Figure 4:
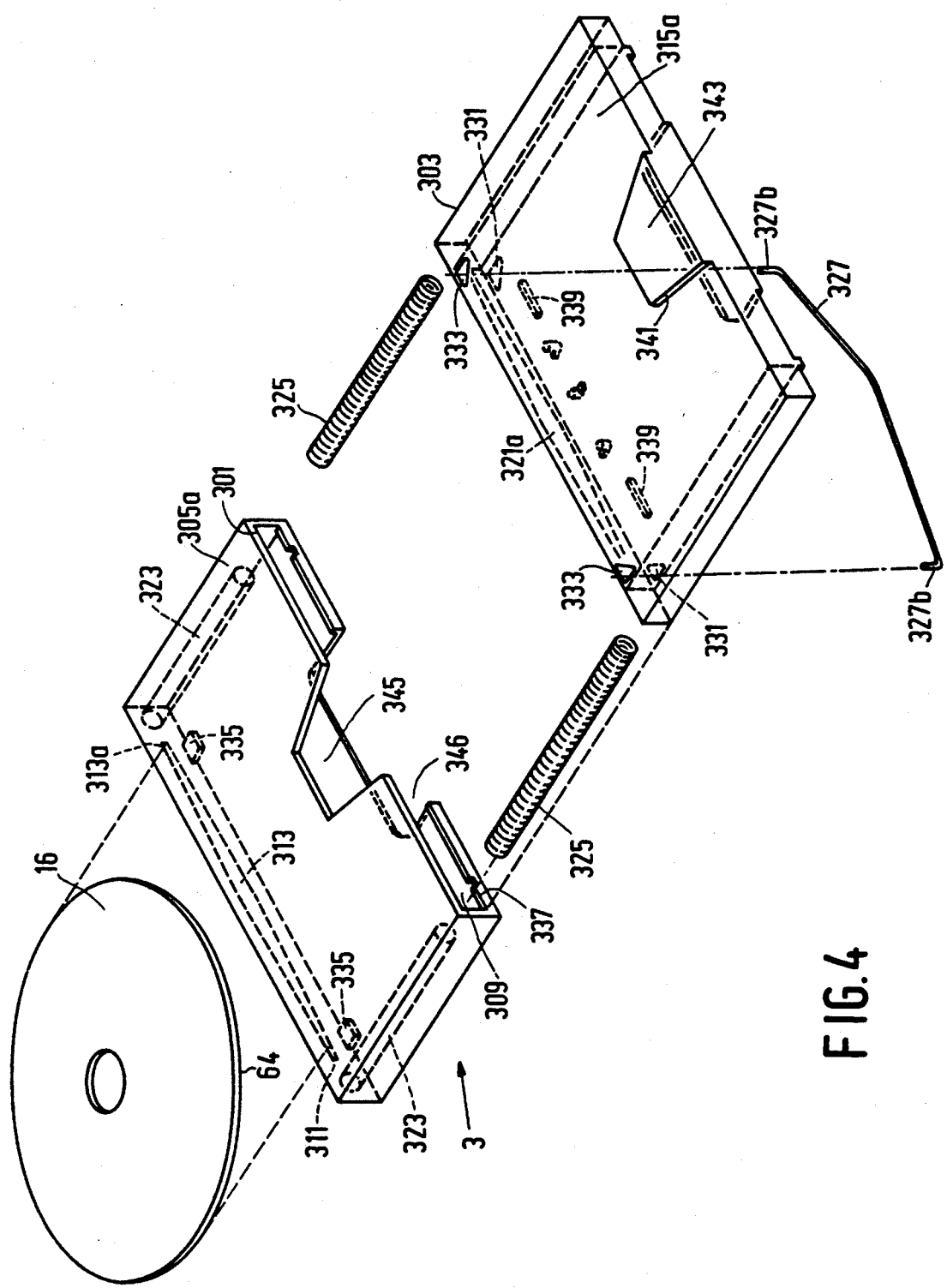
Figure 5:
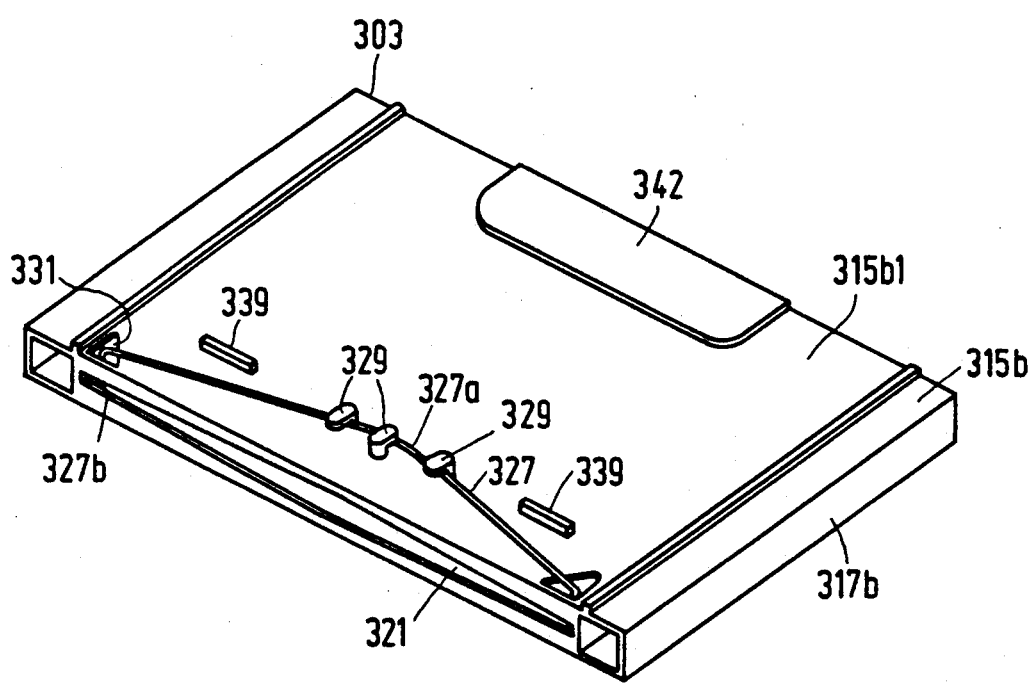

The invention will now be described in more detail, by way of example, with reference to the drawings, in which:

FIG. 1 is an exploded view of an embodiment of the scanning system in accordance with the invention, comprising a scanning device with an automatic loading system and a cassette in accordance with the invention, FIG. 2 is a perspective and partly cut-away view of an embodiment of the cassette in accordance with the invention, FIG. 3 is a perspective view showing the cassette of FIG. 2, with an information carrier stored therein, FIG. 4 is an exploded view of a slightly modified embodiment of the cassette in accordance with the invention, FIG. 5 is an underneath view of a part of the cassette shown in FIG. 4, and FIGS. 6A–6F show diagrammatically the cassette in accordance with the invention in a number of operational conditions.

The scanning device in accordance with the invention shown in FIG. 1 comprises a scanning device, also referred to hereinafter as "disc player", which is suitable for inscribing and/or reading optical disc-shaped information carriers, such as CDs and CD-singles, and a cassette 3. The disc player, which is intended for mounting in a dashboard of a car, comprises frame made up of a partly metal first frame section 2 and a flat plastics second frame section 4, and an optical scanning unit 6 secured to the frame section 4. The frame 2, 4 is accommodated in a casing or housing 7 having a front wall 8. The front wall 8, which carries control knobs and buttons such as an eject button 12, has an insertion slot 14 for inserting an optical information carrier or disc, in the present example a CD, bearing the reference numeral 16 into the disc player in a loading direction A1 and removing it from said player in an unloading direction A2.

The frame section 2 has a main wall 18, and two side walls 20 and 22 secured to the inner side of the main wall 18 of the frame section 2.

The disc player shown in FIG. 1 further comprises an automatic loading system 28 with a centring device 30. The centring device 30 comprises a first pair of pivotal arms 32 and 34 and a second pair of pivotal arms 36 and 38. The first pivotal arms 32 and 34 are supported on the frame section 4 by means of pivots 40 and 42 so as to be pivotable about pivotal axes 41 and 43 respectively. The second pivotal arms 36 and 38 are supported on the frame section 4 by means of pivots 44 and 46 so as to be pivotable about pivotal axes 45 and 47 respectively. A tension spring 50 is arranged between the first pivotal arms 32 and 34, which are movably coupled by means of a pin-slot linkage 48. The second pivotal arms 36 and 38 are movably coupled to the first pivotal arms 32 and 34 by means of two pin-slot linkages 52 and 54. The first pivotal arms 32 and 34 comprise centring elements 56 and 58 and the second pivotal arms 36 and 38 comprise centring elements 60 and 62. The centring elements 56, 58, 60 and 62, which are intended for cooperation with a circumferential edge 64 of the optical disc 16, are constructed as rollers, the central axes of the centering elements 56, 58, 60 and 62 extending parallel to the pivotal axes 41, 43, 45 and 47. To allow cooperation with the circumferential edge 64 the frame section 4 has four slots 66, 67, 68 and 69 through which the centring elements 56, 58, 60 and 62 extend.

The optical scanning unit 6 of a type know per se, for example as disclosed in U.S. Pat. No. 4,403,316 (herewith incorporated by reference), comprises a subframe 72 which is connected to the frame section 2 by means of four pins extending through holes 70 in the side walls 20 and 22 of the frame section 2, and four resilient and damping elements 74. The scanning unit 6 comprises a turntable 78 which is rotatable about an axis of rotation 76 and which has a centring mandrel 80 and a supporting surface 82 for an optical disc. The axis of rotation 76 extends parallel to the mutually parallel pivotal axes 41, 43, 45 and 47. The scanning unit 6 further comprises an objective 84, which in the present example is secured to an electromagnetically drivable pivotal arm 86.

The loading system 28 comprises a drive member 88 which is rotatably supported in a tilting element 90 and carries two spaced-apart plastics rollers 89a and 89b. The tilting element 90 has two holes 92 which correspond to two holes 94 in the side walls 20 and 22 in the frame section 2, the tilting element 90 being supported by means of two pins which extend through the holes 92 and 94 to define a tilting axis for the tilting element 90. The drive roller 88 is driven by an electrical drive unit or electric motor 97, in the present example a d.c. motor, via a gear transmission, not shown, said motor being secured to a fixing portion 96 of the side wall 22 of the frame section 2.

An optical disc inserted into the insertion slot or front opening 14 in the wall 8 by means of the cassette 3 activates a control unit 10 and the drive member 88, which is rotatable about an axis 109, moves said disc between the centring elements 56, 58, 60 and 62 of the centring device 30 to a position above the turntable 78 of the scanning device 6. During insertion of the optical disc 16 the axially spaced rollers 89a and 89b cooperate with a surface 91 of the optical disc, the optical disc being disposed between the rollers and the frame section 4 and successively coming into contact with the first centring elements 56 and 58 and the second centring elements 60 and 62. The insertion movement ceases once the desired position of the optical disc relative to the turntable is detected. For this purpose the frame carries a detection unit, for example a detection switch 200.

The disc-record player 1 comprises a latching device 75 for latching the subframe 72 of the scanning unit 6. In the present example the latching device 75 comprises two pin-shaped latching members 77 which are integral with a plastics latching element 79. The latching element 79 is movably connected to said tilting element 90, which forms part of the latching device 75, and is pivotable relative to the tilting element 90 about a pivotal axis 81. The tilting element 90 with the latching element 79 secured thereto is situated between the front wall 8 and a side 83 which faces the opening 14 in the front wall and forms the front side of the subframe 72. The front side 83 is formed with two openings 85 situated opposite the latching members 77 and engageable by the latching members 77 to latch the subframe 72. In order to enable the latching members 77 to be moved towards and away from the openings 85 during tilting of the tilting element 90 the latching element 79 comprises at least one arm 87 with a pin 189, which engages a slot 191 formed in the wall 22 of the frame section 2 and having a guiding edge 93.

For completely locking the subframe 72 relative to the frame 2, 4 during insertion and removal of an optical disc a pivotable latching unit 103 is arranged near the rear 101 of the subframe 72, which unit comprises a latching pin 111. By pivoting the latching unit 103 about the axis 113 the latching pin 111 can be coupled to or disengaged from a coupling member 115 of the subframe 72.

The disc-record player shown in FIG. 1 comprises a command element 118 which is supported on the frame section 2 so as to be movable in the directions indicated by the arrows A1 and A2. For this purpose the command element 118 has four guide slots 120, 121, 122 and 123, which are engaged by guide pins of the main wall 18 and the side wall 22 of the frame section 2. The command element 118 is driven by the electric motor 97 via a partly shown gear transmission 124.

The command element 118 has an inclined slot 134 engaged by a pin 117 of the tilting element 90, and a slot 119 engaged by a pin 121 of the latching unit 103, which pin extends through a slot 123 in the frame section 2. If the command element 118 is driven by the electric motor 97 after the optical disc 16 has been brought into the desired position relative to the turntable 78 the centring elements 56, 58, 60 and 62 are positioned at an appropriate distance from the disc via a coupling, not shown, with the command element and the drive member 88 by a tilting movement of the tilting element 90, and the latching members 77 are also disengaged from the openings 85 by tilting the tilting element 90 and the latching pin 111 is disengaged from the coupling member 115 of the subframe 72 by a pivotal movement of the element 103. Moreover, the optical disc is pressed against the supporting surface 82 of the turntable 78 by a disc-pressure member 148, for which purpose the command element comprises an actuating projection 146.

In order to remove an optical disc from the turntable 82 the command element 118 is moved in the direction indicated by the arrow A2 by means of the drive unit 97, for example after depression of the eject button 12, the latching members 77 and the latching pin 111 being coupled to the subframe 72 respectively by a tilting movement of the tilting element 90 and a pivotal movement of the latching unit 103 as a result of the movement of the pin 117 in the slot 134 and the pin 121 in the slot 119. During the movement of the command element 118 in the direction A2 the spring 50 between the first pivotal arms 32 and 34 ensures that the centring elements 56, 58, 60 and 62 are moved towards the circumferential edge of the disc. The spring force produced by the spring 50 is then adequate to move the disc lying on the turntable so far along the axis of rotation 76 of the turntable 78 by means of the double conical centring elements 56, 58, 60 and 62 that the disc can be moved out past the centring cone 80 if the roller 88 is driven in the correct direction.

The cassette 3 in accordance with the invention, shown in FIGS. 2, 3, 4 and 5, comprises a sleeve-shaped housing 301 and a box-shaped holder 303, each made of a transparent or opaque plastics material. The housing 301 has two parallel main walls 305A and 305B, which are interconnected by two side walls 307A and 307B. The housing also has one at least substantially open side 309 and one partly open side 311 with a more or less diamond-shaped insertion slot 313 for inserting and removing an information carrier into/from the cassette. The slot 313, which is narrowed towards its ends 313A, supports an information disc situated in the slot only at the edge 64 of the disc, which precludes damaging of the information area of the information carrier. The holder 303 also has two parallel main walls 315A and 315B, interconnected by two side walls 317A and 317B. The holder 303 further has one imperforate side 319 and one at least partly open side 321, preferably formed with a diamond-shaped insertion slot 321A.

The holder 303 extends into the housing 301 via the open side 309 and is slidable relative to the housing 301 between a slid-out position, as shown in FIGS. 1, 2, 3, 6A, 6C, 6D and 6F, and a slid-in position, as shown in FIGS. 6B and 6E. In the slid-out position the housing 301 and the holder 303 together define a storage space 304 for an information carrier, in the present example the Compact Disc 16. Said slid-out position is maintained by means of two pressure springs, in particular helical springs, arranged in the cassette and around the guide rods 323.

Latching means have been provided in order to prevent the information carrier 16 in the storage space 304 from being moved and falling out of the cassette. These means comprise a spring mechanism, in particular a bent wire spring 327, which is secured to a reentrant wall portion 315B1 of the main wall 315B of the holder 303 by its central portion 327A, for example by means of a plurality of hook-shaped projections 329 which have been moulded on the holder 303. The wire spring 327 comprises two upright bent free end portions 327B, which serve as gripping and latching or locking members and which engage openings 331 in the main wall 315B and openings 333 in the main wall 315A.

The wire spring 327 has such characteristics that in its relaxed condition the distance between the end portions 327B is smaller than the diameter of the information carrier 16. Moreover, since the central portion 327A of the bent wire spring is situated near the centre of the storage space the free end portions 327B are very suitable for latching the information carrier in the slid-out position and for gripping an information carrier in the nearly slid-in position of the holder 303. In this position the free end portions 327B engage with a part of the circumferential edge 64 of the information carrier 16 which is situated inside or partly inside the cassette. When the holder 313 is moved from the slid-out position to the slid-in position so that the storage space becomes smaller, the free end portions ultimately meet an unlatching element in the form of two projections 335, as a result of which the free end portions 327B are moved so far apart as the movement of the holder proceeds that the information carrier 16 is situated freely in the holder 303 and can readily be slid out of the holder in the slid-in position of the holder. The edges of the openings 331 and 333 may serve to limit the displacements of the free end portions 327B.

On its side 309 the housing 301 has an edge portion 337 for cooperation with two latching projections on the main wall 315B of the holder 301. In the slid-out position of the holder the edge portion 337 and the projections 339 constitute interengaging stops to define the slid-out position of the holder relative to the housing.

In order to enable the cassette to be handled more conveniently with one hand the main wall 315A of the holder 303 comprises a raised portion 341 with a gripping surface 343. In the slid-in position of the holder 303 the raised portion 341 engages a recess 345 formed in the wall 305A of the housing 301 and corresponding to the gripping surface 343. The main wall 315B has a similar recess 342 which is engageable in a recess 346 in the wall 305B.

FIGS. 6A through 6F diagrammatically show the position of the scanning device 1 and the cassette 3 of the scanning system in accordance with the invention relative to one another for a number of situations, assuming that the cassette is each time held with one hand. In FIG. 6A the cassette 3 with an optical information carrier 16 in its storage space is situated opposite to and at some distance from the insertion slot 14 of the disc-record player. In FIG. 6B the housing 301 of the cassette 3 is placed against a surface 8A of the front wall 8, and at the same time the holder is moved from the slid-out position to the slid-in position in the direction of insertion A1 and the information carrier 16 is partly inserted into the slot 14. In order to facilitate insertion of the information carrier into the slot 14 the surface 8A may comprise locating portions which are inclined relative to the front wall 8. In the situation shown in FIG. 6C the information carrier has been moved completely into the housing 7 by the loading device of the disc-record player 1 and the cassette 3 has been removed from the front wall 8. In FIG. 6D the player 1 contains the information carrier 16, which has been moved out partly via the slot 14 by the loading device. The information carrier 16 then projects from the slot 14 in the front wall 8 over a distance d larger than the radius R of the information carrier. In the example shown, which relates to a Compact Disc of 120 mm diameter, the distance d is 73 mm. FIG. 6E shows how the cassette 3 has been slid by hand onto the information carrier 16 which projects well over half its diameter. FIG. 6F shows the cassette 3 with the reinserted information carrier 16 removed from the player, in which situation the holder 303 has been moved from the slid-in position to the slid-out position under the influence of a spring force acting in the direction A2 during the initial stage of the cassette movement in the direction A2, the information carrier 16 being gripped and latched at the same time by the latching means.

It is to be noted that the invention is not limited to the embodiments shown in the drawings. For example, cassettes having other latching means than shown and scanning systems comprising another automatic loading device than shown also fall within the scope of the invention. Another type of automatic loading device is known, for example, from GB-A 2,069,745 (herewith incorporated by reference). Moreover, cassettes suitable for storing information carriers of another type than shown, such as magneto-optical disc carriers or carriers with magnetic strips, also fall within the scope of the invention.

We claim:

1. A cassette for storing and handling an information carrier, the cassette comprising a sleeve-shaped housing and a box-shaped holder which is slidable in the housing, characterized in that the sleeve-shaped housing has an open first side and, opposite thereto, an at least partly open second side, the holder, which extends permanently into the housing through said first side, being slidable between a slid-out position, in which the holder together with the housing forms a storage space for the information carrier, and a slid-in position for moving the information carrier out of the cassette via said second side, latching means being provided for latching the information carrier in the storage space in the slid-out position of the holder.

2. A cassette as claimed in claim 1, characterized in that the latching means are arranged on the holder and comprise a spring mechanism for cooperation with a circumferential edge of the information carrier.

3. A cassette as claimed in claim 2, characterized in that the spring mechanism comprises two latching elements, the distance between the latching elements which are engageable against the circumferential edge of the information carrier in the slid-out position of the holder being smaller than the diameter of the information carrier for which the cassette is intended.

4. A cassette as claimed in claim 2, characterized in that the spring mechanism comprises a wire spring which is bent in the direction of insertion of the holder and which has two free end portions functioning as latching elements, a central portion of said spring being secured to the holder and the distance between the ends being variable by displacement of the end portions.

5. A cassette as claimed in claim 2, characterized in that the spring mechanism comprises a blade spring which is bent in the direction of insertion of the holder and which has two free end portions functioning as latching elements, a central portion of said spring being secured to the holder and the distance between the ends being variable by displacement of the end portions.

6. A cassette as claimed in claim 1, characterized in that the latching means are situated substantially inside a reentrant wall portion of the holder.

7. A cassette as claimed in claim 1, characterized in that there are provided unlatching means for unlatching the information carrier which projects from the housing in the slid-in position of the holder.

8. A cassette as claimed in claim 7, characterized in that the unlatching means are arranged on the housing and comprise at least one unlatching element which presses against the latching means in the slid-in position of the holder to release the information disc.

9. A cassette as claimed in claim 8, characterized in that the unlatching element is situated inside the housing, opposite the latching means.

10. A cassette as claimed in claim 1, characterized in that the housing and the holder comprise stops which cooperate with one another in the slid-out position of the holder.

11. A cassette as claimed in claim 10, characterized in that at least one resilient element acts between the housing and the holder to exert on the holder a force which is directed from the slid-in towards the slid-out position.

12. A cassette as claimed in claim 11, characterized in that the resilient element is a longitudinally guided helical spring.

13. A cassette as claimed in claim 1, characterized in that said second side has an insertion slot which narrows towards the slot ends.

14. A cassette as claimed in claim 1, characterized in that the holder comprises a wall having a projecting gripping surface and the housing comprises a wall having a recess which corresponds to the gripping surface and which is engaged by the projecting gripping surface in the slid-in position of the holder.

* * * * *